US012374476B2

(12) United States Patent
Akiyama

(10) Patent No.: US 12,374,476 B2
(45) Date of Patent: *Jul. 29, 2025

(54) MULTILAYER VARISTOR AND METHOD OF MANUFACTURING THE SAME

(71) Applicant: Panasonic Intellectual Property Management Co., Ltd., Osaka (JP)

(72) Inventor: Yuto Akiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 420 days.

This patent is subject to a terminal disclaimer.

(21) Appl. No.: 17/985,076

(22) Filed: Nov. 10, 2022

(65) Prior Publication Data

US 2023/0143255 A1 May 11, 2023

(30) Foreign Application Priority Data

Nov. 11, 2021 (JP) ................................ 2021-184419

(51) Int. Cl.
*H01C 1/148* (2006.01)
*H01C 7/105* (2006.01)
*H01C 17/28* (2006.01)

(52) U.S. Cl.
CPC ............. *H01C 1/148* (2013.01); *H01C 7/105* (2013.01); *H01C 17/283* (2013.01)

(58) Field of Classification Search
CPC ........ H01C 7/10; H01C 7/105; H01C 17/283; H01C 1/148
See application file for complete search history.

(56) References Cited

U.S. PATENT DOCUMENTS

2003/0043012 A1* 3/2003 Shiraishi ................ H01C 7/102 338/21
2004/0119579 A1* 6/2004 Takehana ............. H01C 17/283 338/20
2009/0021340 A1* 1/2009 Koyama .................. H01C 7/18 338/20
2016/0090661 A1* 3/2016 Kitada ................... H01C 7/021 338/22 R
2023/0274864 A1* 8/2023 Akiyama ................. H01C 7/10 29/621

FOREIGN PATENT DOCUMENTS

JP 2003-151805 A 5/2003
JP 2010027730 * 2/2010
JP 2017064916 * 4/2017

OTHER PUBLICATIONS

JP2010027730 translation (Year: 2010).*
JP2017064916 translation (Year: 2017).*

* cited by examiner

*Primary Examiner* — Kyung S Lee
(74) *Attorney, Agent, or Firm* — Rimon P.C.

(57) ABSTRACT

A multilayer varistor includes a sintered body, an internal electrode disposed in the sintered body, a high-resistance layer covering at least part of the sintered body, and an external electrode covering part of the high-resistance layer, the external electrode being electrically connected to the internal electrode. An arithmetic mean roughness of a surface of the high-resistance layer is greater than or equal to 0.06 μm.

16 Claims, 2 Drawing Sheets

MULTILAYER VARISTOR AND METHOD OF MANUFACTURING THE SAME

CROSS-REFERENCE TO RELATED APPLICATION

The present application is based upon and claims the benefit of priority to Japanese Patent Application No. 2021-184419, filed on Nov. 11, 2021, the entire contents of which are incorporated herein by reference.

TECHNICAL FIELD

The present disclosure relates to multilayer varistors and methods of manufacturing the multilayer varistors, and specifically, to a multilayer varistor including a sintered body, an internal electrode, and an external electrode and a method of manufacturing the multilayer varistor.

BACKGROUND ART

A varistor is used, for example, to protect various types of electronic apparatuses, electronic devices, and the like from abnormal voltages caused by lightning surges, static electricity, and the like, and to prevent the electronic apparatuses, electronic devices, and the like from malfunctioning due to noises generated in their circuits.

JP 2003-151805 A discloses a chip-type electronic component including: a ceramic body; a glass-coating layer coated on at least part of surfaces of the ceramic body; and external electrodes on both end surfaces of the ceramic body. JP 2003-151805 A describes that setting the thickness of the glass-coating layer to be greater than or equal to a predetermined value can suppress plating from depositing on the surface of the ceramic body during plating.

Similarly to the chip-type electronic component described above, a multilayer varistor generally includes a high-resistance layer such as a glass-coating layer, a primary electrode as the external electrode; a plating electrode, and the like.

Therefore, providing the multilayer varistor with the high-resistance layer enables plating to be suppressed from depositing. However, in connection with, for example, the use of the primary electrode including Ag as a major component, migration may occur at the surface of the high-resistance layer under conditions of voltage application and wetting.

SUMMARY

An object of the present disclosure is to provide a multilayer varistor in which the occurrence of migration at a surface of a high-resistance layer is suppressed and a method of manufacturing the multilayer varistor.

A multilayer varistor according to an aspect of the present disclosure includes: a sintered body; an internal electrode disposed in the sintered body; a high-resistance layer covering at least part of the sintered body; and an external electrode disposed to cover part of the high-resistance layer, the external electrode being electrically connected to the internal electrode. An arithmetic mean roughness of a surface of the high-resistance layer is greater than or equal to 0.06 μm.

A multilayer varistor according to an aspect of the present disclosure includes: a sintered body having a pair of main surfaces opposite to each other, a pair of side surfaces opposite to each other, and a pair of end surfaces opposite to each other; an internal electrode disposed in the sintered body, the internal electrode facing the main surfaces; a high-resistance layer covering at least part of the sintered body; and an external electrode covering part of the high-resistance layer on one of the end surfaces, the external electrode being electrically connected to the internal electrode. an arithmetic mean roughness of a surface of the high-resistance layer is greater on the side surfaces than on the main surfaces.

A method of manufacturing a multilayer varistor according to an aspect of the present disclosures includes a first step, a second step, a third step, and a fourth step. The first step includes preparing a sintered body including ZnO as a major component, an internal electrode being disposed in the sintered body. The second step includes forming a high-resistance layer covering at least part of the sintered body. The third step includes applying a primary electrode paste such that the primary electrode paste covers part of the high-resistance layer and is in contact with part of the internal electrode. The fourth step includes forming a plating electrode covering at least part of a primary electrode formed from the primary electrode paste. An arithmetic mean roughness of a surface of the high-resistance layer after the second step is greater than or equal to 0.06 μm and less than or equal to 0.9 μm.

A method of manufacturing a multilayer varistor according to an aspect of the present disclosures includes a first step, a second step, a third step, and a fourth step. The first step includes preparing a sintered body including ZnO as a major component and including internal electrode disposed in the sintered body. The second step includes forming a high-resistance layer covering at least part of the sintered body. The third step includes applying a primary electrode paste covering part of the high-resistance layer and being in contact with part of the internal electrode. The fourth step includes forming a plating electrode covering at least part of a primary electrode formed from the primary electrode paste. The second step includes spraying, while stirring a plurality of the sintered bodies, a solution including a precursor of the high-resistance layer toward the sintered bodies, and thermally treating each of the sintered bodies provided with the precursor to form the high-resistance layer.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

1. Overview

A multilayer varistor according to an embodiment of the present disclosure will be described below with reference to the drawings. Note that the drawings to be referred to in the following description of the embodiment are schematic representations. Thus, the sizes, thicknesses, and other attributes of the respective constituent elements illustrated on those drawings are not always to scale, compared with actual ones.

Figure 1:
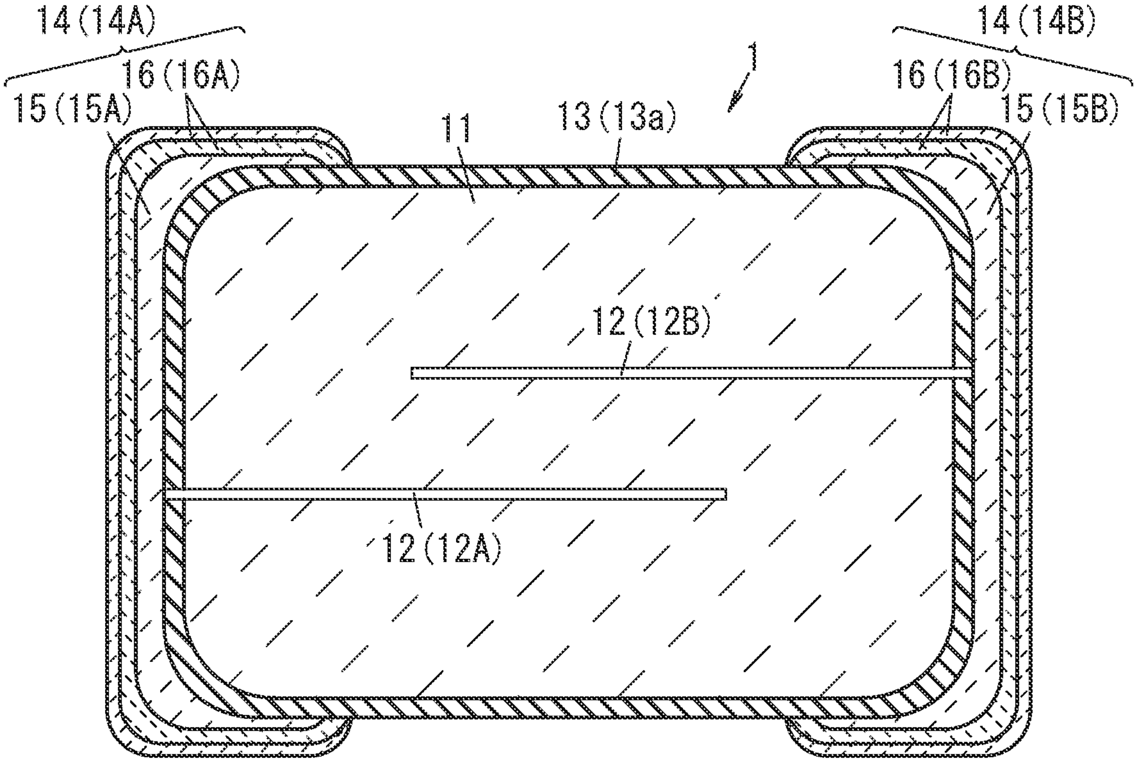
FIG. 1 is a schematic sectional view of a multilayer varistor according to an embodiment of the present disclosure.

As shown in FIG. 1, a multilayer varistor 1 of the present embodiment includes a sintered body 11, internal electrodes 12, a high-resistance layer 13, and external electrodes 14. A feature of the multilayer varistor 1 is that the arithmetic mean roughness (hereinafter also referred to as Ra) of a surface of the high-resistance layer 13 is greater than or equal to 0.06 μm. As used herein, the term "surface" refers to a surface in an exposed area that is not covered with another layer or the like.

The value of the Ra of a surface of the sintered body 11 is controllable by adjusting raw materials and/or baking conditions, but electrical characteristics such as a varistor voltage change depending on the value of the Ra. Therefore, controlling both the electrical characteristics and the Ra to be desired values is difficult. However, the inventors found that both the electrical characteristics and the Ra are controllable to be desired values by controlling the value of the Ra of the surface of the high-resistance layer 13 formed on the surface of the sintered body 11. That is, the Ra of the surface of the high-resistance layer 13 can be changed while the electrical characteristics are secured. The inventors found that setting the Ra of the surface of the high-resistance layer 13 to be larger than or equal to a specific value can suppress the occurrence of migration at the surface of the multilayer varistor 1. The reason why the multilayer varistor 1 configured as described above provides the effect described above is not necessarily clear but can be inferred as indicated below. The migration in the multilayer varistor 1 may be caused due to elution and movement of metal ions such as Ag ions from the external electrodes 14, and deposition of metal. To take care of this, the Ra of the surface of the high-resistance layer 13 of the multilayer varistor 1 is controlled to be larger than or equal to a specific value to increase the creepage distance between the external electrodes 14, that is, the distance of a path along the surface of the high-resistance layer 13 between the external electrodes 14, thereby increasing a distance that ions and the like have to move to cause the migration. This enables in the multilayer varistor 1, a mobility barrier to be increased, which consequently enables the occurrence of the migration at the surface of the high-resistance layer 13 to be suppressed.

The inventors further studied the configuration of the multilayer varistor 1 of the present embodiment and found that performing control such that arithmetic mean roughnesses of respective surfaces of the high-resistance layer 13 are in a specific relationship also enables the occurrence of the migration at the surface of the high-resistance layer 13 to be suppressed.

As shown in FIG. 1, the multilayer varistor 1 includes the sintered body 11, the internal electrodes 12, the high-resistance layer 13, and the external electrodes 14. The sintered body 11 has a pair of main surfaces opposite to each other (an upper surface and a lower surface in FIG. 1), a pair of side surfaces opposite to each other, and a pair of end surfaces opposite to each other (a right surface and a left surface in FIG. 1). The external electrodes 14 are disposed on the end surfaces to cover part of the high-resistance layer 13 and are electrically connected to the internal electrodes 12. A feature of the multilayer varistor 1 is that the Ra of a surface of a high-resistance layer (hereinafter, also referred to as a side surface high-resistance layer 13*b*) on each side surface is greater than the Ra of a surface of a high-resistance layer (hereinafter, also referred to as a main surface high-resistance layer 13*a*) on each main surface.

The inventors found that when a high-resistance layer is formed on the sintered body 11 produced by baking a rectangular parallelepiped piece obtained by cutting, the Ra of the surface, which is a cut surface side of the sintered body 11, of the side surface high-resistance layer 13*b* is greater than the Ra of the surface of the main surface high-resistance layer 13*a*. Increasing the Ra of the surface of the side surface high-resistance layer 13*b* could be considered to suppress the occurrence of the migration in the multilayer varistor 1.

A method of manufacturing the multilayer varistor 1 according to the present embodiment includes a first step, a second step, a third step, and a fourth step. The first step includes preparing the sintered body 11 including ZnO as a major component, the internal electrodes 12 being disposed in the sintered body 11. The second step includes forming the high-resistance layer 13 covering at least part of the sintered body 11. The third step includes applying a primary electrode paste covering part of the high-resistance layer 13 and being in contact with part of the internal electrodes 12. The fourth step includes forming plating electrodes 16 covering at least part of primary electrodes 15 formed from the primary electrode paste. An arithmetic mean roughness of a surface of the high-resistance layer 13 after the second step is greater than or equal to 0.06 μm and less than or equal to 0.9 μm.

According to the method of manufacturing the multilayer varistor 1 of the present embodiment, the Ra of the surface of the high-resistance layer 13 can be within a specified range, which enables the multilayer varistor 1, in which the occurrence of the migration at the surface of the high-resistance layer 13 is suppressed, to be manufactured.

A method of manufacturing the multilayer varistor 1 according to the present embodiment includes the first to fourth steps as described above. The second step includes spraying a solution including a precursor of the high-resistance layer 13 onto a plurality of sintered bodies 11 while stirring the sintered bodies 11, and thermally treating each of the sintered bodies 11 provided with the precursor to form the high-resistance layer 13.

According to such a method, the high-resistance layer 13 having a large number of raised portions can be formed, and therefore, the Ra of the surface of the high-resistance layer 13 can be increased, which consequently enables the multilayer varistor 1, in which the occurrence of the migration at the surface of the high-resistance layer 13 is suppressed, to be manufactured.

Thus, the present disclosure provides a multilayer varistor in which the occurrence of migration at a surface of a high-resistance layer is suppressed and a method of manufacturing the multilayer varistor.

2. Details

<Multilayer Varistor>

FIG. 1 is a sectional view of the multilayer varistor 1 according to the embodiment of the present disclosure. The multilayer varistor 1 includes the sintered body 11, the internal electrodes 12, the high-resistance layer 13, and the external electrodes 14.

The sintered body 11 includes a semiconductor ceramic component having nonlinear resistance characteristics.

The multilayer varistor 1 is provided with at least one pair of external electrodes 14. Here, the pair of external electrodes 14 include a first external electrode 14A on one of the end surfaces of the sintered body 11, and a second external electrode 14B on the other of the end surfaces of the sintered body 11. When a voltage is applied between the first external electrode 14A and the second external electrode 14B, one of the first external electrode 14A and the second external electrode 14B serves as a high-potential electrode, and the other of the first external electrode 14A and the second external electrode 14B serves as a low-potential electrode.

Figure 2:
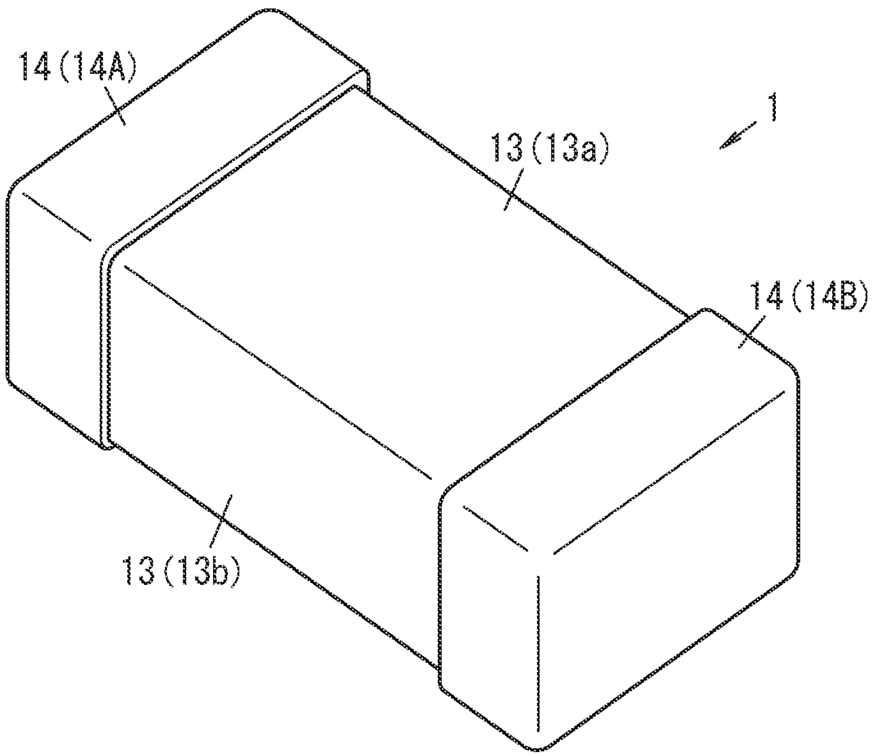
FIG. 2 is a schematic perspective view of the multilayer varistor.

In the multilayer varistor 1 shown in FIG. 2, the pair of external electrodes 14 are disposed on the pair of end surfaces opposite to each other. The number and the locations of the external electrodes 14 are not limited to this example, but a pair of external electrodes 14 may be provided on the side surfaces, or a pair of external electrodes 14 may be provided on the end surfaces and a pair of external electrodes 14 may be provided on the side surfaces.

The internal electrodes 12 are at least provided such that one or more of the internal electrodes 12 are electrically connected to each of the external electrodes 14. The multilayer varistor 1 shown in FIG. 1 includes two internal electrodes 12. That is, the internal electrodes 12 include a first internal electrode 12A and a second internal electrode 12B. The first internal electrode 12A is electrically connected to the first external electrode 14A. The second internal electrode 12B is electrically connected to the second external electrode 14B.

The at least one pair of external electrodes 14 are mounted on a printed circuit board on which an electric circuit is to be formed. The multilayer varistor 1 is to be connected, for example, to an input side of the electric circuit. When a voltage exceeding a predetermined threshold voltage is applied between the first external electrode 14A and the second external electrode 14B, the electric resistance between the first external electrode 14A and the second external electrode 14B rapidly decreases, and a current flows through a varistor layer, and therefore, the electric circuit downstream of the multilayer varistor 1 can be protected.

[Sintered Body]

The semiconductor ceramic component having nonlinear resistance characteristics and constituting the sintered body 11 includes, for example, ZnO as a major component, and $Bi_2O_3$, $Co_2O_3$, $MnO_2$, $Sb_2O_3$, $Pr_6O_{11}$, $Co_2O_3$, $CaCO_3$, $Cr_2O_3$ or the like as a minor component. The varistor layer constituting the sintered body 11 is formed by, for example, baking ceramic sheets including these components, whereby the major component such as ZnO and some of the minor components are sintered to form a solid solution, and the remaining minor components deposit on grain boundaries between the major component and the minor components.

More specifically, ceramic sheets each including the components described above are stacked on each other to obtain a laminate, which is then cut perpendicularly to a lamination surface of the laminate to obtain a piece, and the piece is baked, thereby producing the sintered body 11. The sintered body 11 thus produced includes, for example, a shape having a pair of main surfaces opposite to each other, a pair of side surfaces opposite to each other, and a pair of end surfaces opposite to each other. The “main surfaces” are lamination surfaces, and of two types of cut surfaces, surfaces having larger areas are the “side surfaces”, and surfaces having smaller areas are the “end surfaces”. The shape of the sintered body 11 is, for example, a rectangular parallelepiped having two each of these surfaces, that is, a total of six surfaces.

[Internal Electrode]

The internal electrodes 12 are provided in the sintered body 11. The internal electrodes 12 include, for example, Ag, Pd, PdAg, or PtAg, and are usually formed by stacking, on each other, ceramic sheets provided with the internal electrode paste and by baking the ceramic sheets.

[High-Resistance Layer]

The high-resistance layer 13 has higher resistance than the sintered body 11. The high-resistance layer 13 is provided to cover at least part of the sintered body 11. The surface shape, such as the Ra of the surface, of the high-resistance layer 13 is controllable by appropriately selecting, for example, a later-described method of forming the high-resistance layer 13 and a later-described method of producing the sintered body 11.

The Ra of the surface of the high-resistance layer 13 is greater than or equal to 0.06 μm. This enables the occurrence of the migration at the surface of the high-resistance layer 13 to be suppressed. When the Ra is smaller than the value described above, the creepage distance between the external electrodes 14 is shortened, and migration is thus likely to occur. The Ra is preferably greater than or equal to 0.08 μm, more preferably greater than or equal to 0.15 μm, and much more preferably greater than or equal to 0.25 μm. The Ra is preferably less than or equal to 0.9 μm. In this case, exposed portions of the sintered body 11 could be considered to further decrease, so that the occurrence of the migration can be further suppressed. When the Ra exceeds the value described above, the exposed portions of the sintered body 11 further increase, and plating is likely to deposit, and thus, the occurrence of the migration may not be suppressed in some cases. Further, a flux component of solder may accumulate on the surface. The Ra is more preferably less than or equal to 0.7 μm, and much more preferably less than or equal to 0.4 μm. The Ra of the surface of the high-resistance layer 13 is measurable in accordance with, for example, a method defined by JIS-B0601: (2013), and specifically, is measurable by using Surfcorder (ET4000A manufactured by Kosaka Laboratory Ltd.) which is a highly accurate micro-figure measuring instrument. The Ra may also be measured by, for example, a scanning probe microscope or a non-contact laser microscope.

In the high-resistance layer 13 formed on the sintered body 11 produced as described above and in the shape of a rectangular parallelepiped, the Ra of each of the lamination surfaces (main surfaces) can be greater than or equal to 0.06 μm and less than or equal to 0.85 μm, and the Ra of each of the cut surfaces (the side surfaces and the end surfaces) can be greater than or equal to 0.11 μm less than or equal to 0.9 μm, and thus, the Ra of each of the lamination surfaces and the cut surfaces are controllable. In such a multilayer varistor 1, the Ra of the surface of the side surface high-resistance layer 13*b* can be greater than the Ra of the surface of the main surface high-resistance layer 13*a*, which consequently enables the occurrence of the migration caused by the movement of ions and the like at the side surfaces to be further suppressed. In particular, the occurrence of the migration is more effectively suppressed in a multilayer varistor 1 in which external electrodes 14 are provided on the side surfaces in addition to on the end surfaces and the distance between each of the external electrodes 14 on the end surfaces and each of the external electrodes on the side surfaces is therefore shorter than the distance between the pair of external electrodes 14 on the end surfaces.

The high-resistance layer 13 preferably has a raised portion. The “raised portion” is a portion which is part of the high-resistance layer 13 and which has a thickness greater than 1 μm. Since the high-resistance layer 13 has the raised portion, the creepage distance between the external electrodes 14 is further increased, which enables the occurrence of the migration to be further suppressed.

When the high-resistance layer 13 has a plurality of raised portions, the average length of major axes of the raised portions is preferably greater than or equal to 10 μm and less than or equal to 50 μm. Setting the average length of the major axes of the raised portions to be within the range described above can further increase the creepage distance between the external electrodes 14, which consequently enables the occurrence of the migration to be further suppressed. The average length of the major axes is more preferably greater than or equal to 15 μm and less than or equal to 45 μm, and much more preferably greater than or equal to 20 μm and less than or equal to 40 μm. The "the major axis" of a raised portion refers to the longest length of the shape of the raised portion, which is part of the high-resistance layer 13 and which has a thickness greater than 1 μm, in plan view. The "average length of the major axes" refers to the arithmetic mean value of measured lengths of the major axes of a plurality of raised portions (e.g., any ten raised portions). The average length of the major axes of the raised portions is measurable by observing an elemental mapping image by using the scanning probe microscope or an EPMA.

In the case of a plurality of raised portions, the total area of the plurality of raised portions is preferably greater than or equal to 5% and less than or equal to 30% of the whole area of the surfaces of the high-resistance layer 13. Setting the total area of the plurality of raised portions to be within the range described above can form a roughened surface that cannot be controlled only by the production of the sintered body 11, which consequently enables the occurrence of the migration to be further suppressed. The total area is more preferably greater than or equal to 7% and less than or equal to 27%, and much more preferably greater than or equal to 10% and less than or equal to 25%. The "whole area of the surfaces" of the high-resistance layer 13 is the sum of areas of exposed portions of the high-resistance layer 13, the exposed portions not being covered with the external electrodes 14 and the like. The total area of the plurality of raised portions is measurable based on an observation image of the elemental mappings by using the EPMA.

A method preferably used to form an increased number of raised portions is spraying a later-described solution including the precursor of the high-resistance layer 13 when forming the high-resistance layer 13.

The average thickness of the high-resistance layer 13 is preferably greater than or equal to 0.01 μm. In this case, exposed portions of the sintered body 11 could be considered to further decrease, so that the occurrence of the migration can be further suppressed. The average thickness is more preferably greater than or equal to 0.05 μm, and much more preferably greater than or equal to 0.1 μm. The average thickness of the high-resistance layer 13 is preferably less than or equal to 5 μm. In this case, the high-resistance layer 13 could be considered to further suppress ions or the like from moving, so that the occurrence of the migration can be further suppressed. The average thickness is more preferably less than or equal to 3 μm, and much more preferably less than or equal to 1 μm. The "average thickness" refers to an arithmetic average value of the thicknesses of a high-resistance layer 13 which are measured at a plurality of points (for example, any ten points) of the high-resistance layer 13.

[External Electrode]

The external electrodes 14 are disposed to cover part of the high-resistance layer 13. The external electrodes 14 are electrically connected to the internal electrodes 12.

Each of the external electrodes 14 includes, for example, the primary electrode 15 and the plating electrodes 16. A secondary electrode may be further provided on the primary electrode 15. The secondary electrode is preferably formed to cover the primary electrode 15. As described above, each of the external electrodes 14 (the first external electrode 14A and the second external electrode 14B) may have a multilayer configuration.

(Primary Electrode)

The primary electrodes 15 are provided to cover part of the high-resistance layer 13 and to be electrically connected to the internal electrodes 12. The primary electrodes 15, for example, include a metallic component such as Ag, AgPd, or AgPt, and a glass component such as $Bi_2O_3$, $SiO_2$, or $B_2O_5$. The primary electrodes 15 preferably include metal as a major component, and more preferably include silver as the major component. When the primary electrodes 15 include silver as the major component, the migration easily occurs in the multilayer varistor, but the present disclosure enables the occurrence of the migration to be suppressed, and therefore, the present disclosure provides enhanced benefits. The primary electrodes 15 are usually formed by applying a primary electrode paste to the part of the high-resistance layer 13.

(Plating Electrode)

The plating electrodes 16 are provided to cover at least part of the primary electrodes 15. Each plating electrode 16 includes: a Ni electrode provided, for example, such that the Ni electrode covers at least part of the primary electrode or the secondary electrode; and a Sn electrode provided to cover at least part of the Ni electrode.

<Method of Manufacturing Multilayer Varistor>

The method of manufacturing the multilayer varistor according to the present embodiment includes a first step, a second step, a third step, and a fourth step. Each of the steps will be described below.

[First Step]

The first step includes preparing the sintered body 11 including ZnO as a major component, the internal electrodes 12 being disposed in the sintered body 11.

The sintered body 11 may be produced by applying the internal electrode paste to ceramic sheets produced by adopting a slurry including ZnO, stacking the ceramic sheets on each other, pressing the ceramic sheets, and cutting the ceramic sheets, and then, debindering and baking the ceramic sheets. The slurry can be prepared, for example, by mixing ZnO which is a main raw material, and $Bi_2O_3$, $Co_2O_3$, $MnO_2$, $Sb_2O_3$, $Pr_6O_{11}$, $Co_2O_3$, $CaCO_3$, $Cr_2O_3$, or the like as a minor raw material, and a binder together.

Examples of the internal electrode paste include a Ag-paste, a Pd-paste, a Pt-paste, a PdAg paste, and a PtAg paste.

A temperature at which the debindering is performed is, for example, higher than or equal to 300° C. and lower than or equal to 500° C. A temperature at which the sintering is performed is appropriately adjustable depending on the configuration, composition, and the like of the sintered body 11 to be obtained, and is, for example, higher than or equal to 800° C. and lower than or equal to 1300° C.

The first step includes, for example, a coating step, an internal electrode application step, a lamination step, a cutting step, and a baking step. In the coating step, ceramic sheets including ZnO as a major component are produced. In the internal electrode application step, the internal electrode paste is applied to surfaces of some of the ceramic sheets.

Examples of an application method in the internal electrode application step include printing. The lamination step includes stacking, on each other, the ceramic sheets provided with the internal electrode paste and the ceramic sheets not provided with the internal electrode paste to obtain a laminate. The cutting step includes cutting the laminate to obtain a laminate body having lamination surfaces and cut surfaces. In the baking step, the laminate body is baked to obtain a sintered body having lamination surfaces and cut surfaces.

Such a method can produce a sintered body 11 having a pair of main surfaces opposite to each other, a pair of side surfaces opposite to each other, and a pair of end surfaces opposite to each other. In the sintered body 11 thus produced, the Ra of each of the cut surfaces can be greater than the Ra of each of the lamination surfaces.

[Second Step]

In the second step, the high-resistance layer 13 is formed to cover at least part of the sintered body 11 after the first step.

Examples of the method of forming the high-resistance layer 13 include a method (i) of applying a solution including a precursor of the high-resistance layer 13 to the sintered body 11, a method (ii) of reacting $SiO_2$ with the sintered body 11 including ZnO as a major component, and a method (iii) of thermally diffusing alkali-metal into the sintered body 11.

The method (i) includes applying the solution including the precursor of the high-resistance layer 13 to the sintered body 11 and then performing dehydration and curing, thereby forming the high-resistance layer 13 on the surface of the sintered body 11. Examples of the precursor of the high-resistance layer 13 include a glass component such as polysilazane having Si in its main chain. Using the glass component such as polysilazane having Si in its main chain as the precursor of the high-resistance layer 13 enables a continuous high-resistance layer 13 including $SiO_2$ as a major component to be formed. Such a high-resistance layer 13 could be considered to further reduce the exposed portions of the sintered body 11, which consequently enables the multilayer varistor 1, in which the occurrence of the migration at the surface of the high-resistance layer 13 is further suppressed, to be manufactured.

Examples of the application method include spraying, immersion, and printing. Among these methods, the spraying is a desirable method because the spraying can form the high-resistance layer 13 having an increased number of raised portions each having a thickness of greater than 1 μm, and can thus further increase the Ra of the surface of the high-resistance layer 13. The spraying in this case is preferably performed on a plurality of sintered bodies 11 mixed by being stirred.

The method (ii) includes reacting the sintered body 11 including ZnO as the major component with $SiO_2$ to change a surface region of the sintered body 11 to a high-resistance layer 13 including $Zn_2SiO_4$ as a major component, thereby forming the high-resistance layer 13. Specifically, this method can be performed by, for example, bonding powder or a liquid including $SiO_2$ to the sintered body 11 including ZnO as the major component and then performing thermal treatment or the like.

The method (iii) includes thermally diffusing alkali metal into the sintered body 11 to change the surface region of the sintered body 11 to the high-resistance layer 13, thereby forming the high-resistance layer 13. This method can specifically be performed by, for example, mixing the sintered body 11 with a liquid including alkali metal powder or alkali metallic salt as a major component, and then performing thermal baking.

The second step preferably includes a spraying step and a thermal treatment step in a manner similar to the method (i). The spraying step includes spraying a solution including a precursor of the high-resistance layer 13 onto a plurality of the sintered bodies 11 while stirring the sintered bodies 11. The thermal treatment step includes thermally treating each of the sintered bodies 11 provided with the precursor to form the high-resistance layer 13. This method enables the high-resistance layer 13 having many raised portions to be formed, which consequently enables the multilayer varistor 1, in which the occurrence of the migration is suppressed, to be manufactured.

The Ra of the surface of the high-resistance layer 13 after the second step is preferably greater than the Ra of the surface of the sintered body 11 after the first step. Appropriately selecting the method of forming the high-resistance layer 13 enables the Ra of the surface of the high-resistance layer 13 to be increased, which consequently enables the multilayer varistor 1, in which the occurrence of the migration is further suppressed, to be manufactured.

The average thickness of the high-resistance layer 13 after the second step is preferably greater than the Ra of the surface of the sintered body 11 after the first step. In this case, exposed portions of the sintered body 11 could be considered to further decrease, so that the occurrence of the migration can be further suppressed. When the average thickness of the high-resistance layer 13 is less than the Ra of the sintered body 11, part of the sintered body 11 of the multilayer varistor 1 is exposed, and plating deposition and/or the migration are/is likely to occur. Further, the Ra of the surface of the high-resistance layer 13 after the second step is preferably greater than or equal to 0.06 μm and less than or equal to 0.9 μm.

Furthermore, the Ra of the surface of the high-resistance layer 13 after the second step is controllable by, for example, a method of performing surface polishing by a rotating pot containing polishing powder, a method adopting blasting, or the like. The Ra of the surface of the sintered body 11 after the first step is controllable by, for example, a method of performing dissolution treatment on the surface of the sintered body 11 by acid treatment. The dissolution treatment causes elution of some particles of the sintered body 11 and formation of grain boundaries, thereby increasing the Ra of the surface of the sintered body 11, and therefore, adopting the sintered body 11 enables the surface of the high-resistance layer 13 to have an increased Ra after the second step.

[Third Step]

The third step includes applying the primary electrode paste such that the primary electrode paste covers part of the high-resistance layer 13 and comes into contact with part of the internal electrodes 12.

The primary electrode paste can be prepared by mixing a metallic component including, for example, Ag powder, AgPd powder, AgPt powder, or the like, a glass component including $Bi_2O_3$, $SiO_2$, $B_2O_5$, or the like, and a solvent together. As the primary electrode paste, a paste including Ag as a major component and including a resin component may be used. After the application of the primary electrode paste, baking is performed at a temperature higher than or equal to 700° C. and lower than or equal to 800° C., thereby promoting alloying with the internal electrodes 12, and the primary electrodes 15 having improved adhesion can be formed.

[Fourth Step]

The fourth step includes forming plating electrodes such that the plating electrodes cover at least part of the primary electrodes 15 formed from the primary electrode paste. A method of forming the plating electrodes is, for example, sequentially performing Ni plating and Sn plating by an electrolytic plating method.

Examples

The present disclosure will be more specifically described below with reference to examples, but the present disclosure is not limited to the examples below.

<Manufacturing of Multilayer Varistor>

Multilayer varistors of Examples 1 and 2 and Comparative Example 1 were manufactured by the following steps.

(Preparation of Slurry)

ZnO which is a major component, $Pr_6O_{11}$, $Co_2O_3$, $CaCO_3$, $Cr_2O_3$, or the like which is a minor component, and a binder were mixed together, thereby preparing a slurry.

(Production of Ceramic Sheet)

The slurry thus prepared was molded into a predetermined thickness of greater than or equal to 20 μm and less than or equal to 50 μm, thereby producing ceramic sheets.

(Production of Laminate Body)

As the internal electrode paste, a Pd paste was used. The internal electrode paste was printed, in a predetermined shape, onto some of the ceramic sheets thus produced. The ceramic sheets on which the internal electrode paste was printed and the ceramic sheets on which the internal electrode paste was not printed were stacked on each other, thereby obtaining a laminate having a predetermined electrode structure. The laminate thus obtained was pressed to a predetermined thickness and was then cut into a length of 1.0 mm, a width of 0.5 mm, and a height 0.5 mm, thereby producing a laminate body.

(Production of Sintered Body)

The laminate body thus produced was debindered at a temperature of higher than or equal to 300° C. and lower than or equal to 500° C. and was then baked at a temperature of higher than or equal to 800° C. and lower than or equal to 1300° C., thereby producing a sintered body.

(Formation of High-Resistance Layer)

Onto the sintered body thus produced, a coating liquid containing polysilazane was sprayed by using a spray, and then the precursor adhered to the sintered body was cured at a temperature of higher than or equal to 400° C. and lower than or equal to 600° C., thereby forming a high-resistance layer.

(Formation of Primary Electrode)

Ag powder, glass frit, and a solvent were mixed together, thereby preparing a primary electrode paste. The primary electrode paste was applied to the end surfaces of the sintered body provided with the high-resistance layer and was then baked at 800° C., thereby forming primary electrodes.

(Formation of Plated Electrode)

On the primary electrodes thus formed, Ni plating electrodes having a predetermined thickness were formed by electrolytic plating, and then, Sn plating electrodes were formed on the Ni plating electrodes.

Conditions of the concentration, the rate of spraying, and the like of the coating liquid in forming the high-resistance layer were selected, thereby producing a multilayer varistor of Example 1 in which the arithmetic mean roughness Ra of the surface of the high-resistance layer is 0.3 μm and a multilayer varistor of Example 2 in which the arithmetic mean roughness Ra of the surface of the high-resistance layer is 0.09 μm. In addition, the sintered body was immersed in a coating liquid, and then, the coating liquid was cured, thereby producing a multilayer varistor of Comparative Example 1 in which the Ra is 0.03 μm.

<Evaluation>

The multilayer varistors thus produced were evaluated for the occurrence of migration by a wet load test under the following conditions.

(Conditions)

Temperature: 85° C., relative humidity: 85% RH, load voltage: 18 V, test time period 1000 h (Migration Evaluation)

After the wet load test, the deposition of Ag on the surface of the high-resistance layer, i.e., whether or not the migration occurs was observed by visual observation and elemental analysis.

TABLE 1

| | Arithmetic Mean Roughness of Surface of High-Resistance Layer (Ra) | The Number of Tested Varistors | The Number of Varistors in which Migration Occurred | Percentage of Occurrence of Migration |
|---|---|---|---|---|
| Example 1 | 0.3 μm | 10 | 0 | 0% |
| Example 2 | 0.09 μm | 10 | 0 | 0% |
| Comparative Example 1 | 0.03 μm | 10 | 10 | 100% |

Results in Table 1 shows that in the multilayer varistors of Example 1 and Example 2, the arithmetic mean roughnesses Ra are respectively 0.3 μm and 0.09 μm which are within the scope of the present disclosure, showing that the occurrence of the migration is suppressed. In addition, in the multilayer varistor of Comparative Example 1, the Ra of the surface of the high-resistance layer is 0.03 μm, which is outside the scope of the present disclosure, and the migration occurred.

(Summary)

As can be seen from the embodiment and Examples above, a multilayer varistor (1) of the first aspect includes: a sintered body (11); an internal electrode (12) in the sintered body (11); a high-resistance layer (13) covering at least part of the sintered body (11); and an external electrode (14) covering part of the high-resistance layer (13) and electrically connected to the internal electrode (12). An arithmetic mean roughness of a surface of the high-resistance layer (13) is greater than or equal to 0.06 μm.

According to the first aspect, an increase in the creepage distance between the external electrodes (14) and an increase in a distance that ions or the like have to move to cause the migration enable a migration barrier to be increased, which consequently enables the occurrence of the migration at the surface of the high-resistance layer (13) to be suppressed.

In a multilayer varistor (1) of the second aspect referring to the first aspect, the arithmetic mean roughness of the surface of the high-resistance layer (13) is less than or equal to 0.9 μm.

According to the second aspect, exposed portions of the sintered body (11) could be considered to further decrease, so that the occurrence of the migration is further suppressed.

In a multilayer varistor (1) of a third aspect referring to the first or second aspect, a mean thickness of the high-resistance layer (13) is greater than or equal to 0.01 μm and less than or equal to 5 μm.

According to the 3 aspect, exposed portions of the sintered body (11) could be considered to further decrease, and the high-resistance layer (13) could be considered to further suppress the movement of ions and the like, so that the occurrence of the migration is further suppressed.

In a multilayer varistor (1) of a fourth aspect referring to any one of the first to third aspects, the high-resistance layer (13) has a plurality of raised portions each having a thickness of greater than 1 μm, and an average length of major axes of the plurality of raised portions is greater than or equal to 10 μm and less than or equal to 50 μm.

According to the fourth aspect, setting average length of the major axes of the plurality of raised portions to a specific range further increases the creepage distance between the external electrodes (14), which consequently enables the occurrence of the migration to be further suppressed.

In a multilayer varistor (1) of a fifth aspect referring to the fourth aspect, a total area of the plurality of raised portions is greater than or equal to 5% and less than or equal to 30% of a whole area of the surface of the high-resistance layer (13).

According to the fifth aspect, setting the total area of the plurality of raised portions to a specific range enables a roughened surface, which cannot be controlled only by the production of the sintered body (11), to be formed, it is possible to form a roughened surface, which consequently enables the occurrence of the migration to be further suppressed.

In a multilayer varistor (1) of a sixth aspect referring to any one of the first to fifth aspects, the external electrode (14) includes a primary electrode (15) covering part of the high-resistance layer (13) and a plating electrode (16) covering at least part of the primary electrode (15). The primary electrode (15) includes silver as a major component.

When the primary electrode (15) includes silver as the major component, the migration easily occurs in the multilayer varistor, but according to the sixth aspect, the present disclosure enables the occurrence of the migration to be suppressed, and therefore, the present disclosure provides enhanced benefits.

In a multilayer varistor (1) of a seventh aspect referring to any one of the first to sixth aspects, the sintered body (11) has a pair of main surfaces opposite to each other, a pair of side surfaces opposite to each other, and a pair of end surfaces opposite to each other. The internal electrode (12) faces the main surfaces. The external electrode (14) covers one of the end surfaces. the arithmetic mean roughness of the surface of the high-resistance layer (13) is greater on the side surfaces than on the main surfaces.

The seventh aspect enables the migration to be further suppressed from being caused by the movement of ions and the like at the side surfaces and is particularly effective in suppressing the occurrence of the migration in the multilayer varistor (1) having the external electrodes (14) on the end surface and the side surface and a reduced distance between the external electrodes (14).

In a multilayer varistor (1) of an eighth aspect referring to any one of the first to seventh aspects, the high-resistance layer (13) includes $SiO_2$ as a major component.

According to the eighth aspect, the high-resistance layer (13) includes $SiO_2$ as a major component, and therefore, the high-resistance layer (13) can be a continuous high-resistance layer (13), and such a high-resistance layer (13) could be considered to further reduce the exposed portions of the sintered body (11), so that the occurrence of the migration is further suppressed.

A multilayer varistor (1) of the ninth aspect includes: a sintered body (11) having a pair of main surfaces opposite to each other, a pair of side surfaces opposite to each other, and a pair of end surfaces opposite to each other; an internal electrode disposed in the sintered body (11), the internal electrode facing the main surfaces; a high-resistance layer (13) covering at least part of the sintered body (11); and an external electrode (14) covering part of the high-resistance layer (13), the external electrode (14) being electrically connected to the internal electrode (12). An arithmetic mean roughness of a surface of the high-resistance layer (13) is greater on the side surfaces than on the main surfaces.

The ninth aspect enables the Ra of the surface of the side surface high-resistance layer (13*b*) to be increased to be greater than the Ra of the surface of the main surface high-resistance layer (13*a*). Increasing the Ra of the surface of the side surface high-resistance layer (13*b*) could be considered to suppress the occurrence of the migration in the multilayer varistor 1.

A method of manufacturing a multilayer varistor (1) of a tenth aspect includes a first step, a second step, a third step, and a fourth step. The first step includes preparing a sintered body (11) including ZnO as a major component, an internal electrode (12) being disposed in the sintered body (11). The second step includes forming a high-resistance layer (13) covering at least part of the sintered body (11). The third step includes applying a primary electrode paste such that the primary electrode paste covers part of the high-resistance layer (13) and is in contact with part of the internal electrode (12). The fourth step includes forming a plating electrode (16) covering at least part of a primary electrode (15) formed from the primary electrode paste. An arithmetic mean roughness of a surface of the high-resistance layer (13) after the second step is greater than or equal to 0.06 μm and less than or equal to 0.9 μm.

The tenth aspect enables the arithmetic mean roughness of the surface of the high-resistance layer (13) to be set to a predetermined range, which consequently enables the multilayer varistor (1), in which the occurrence of the migration is suppressed, to be manufactured.

In the manufacturing process of A multilayer varistor (1) of the eleventh aspect, in the tenth aspect, the arithmetic mean roughness of the surface of the high-resistance layer (13) after the second step is greater than an arithmetic mean roughness of a surface of the sintered body (11) after the first step.

According to the eleventh aspect, appropriately selecting the method of forming the high-resistance layer (13) enables the surface of the high-resistance layer (13) to have an increased Ra, which consequently enables the multilayer varistor (1), in which the occurrence of the migration is further suppressed, to be manufactured.

In a method of manufacturing a multilayer varistor (1) of a twelfth aspect referring to the tenth or eleventh aspect, the second step includes spraying, while stirring a plurality of the sintered bodies (11), a solution including a precursor of the high-resistance layer (13) onto the sintered bodies (11), and thermally treating each of the sintered bodies (11) provided with the precursor to form the high-resistance layer (13).

According to the twelfth aspect, the high-resistance layer (13) formed by such a method has an increased number of raised portions. Therefore, the twelfth aspect enables the arithmetic mean roughness of the surface of the high-resistance layer (13) to be increased, which consequently enables the multilayer varistor (1), in which the occurrence of the migration is further suppressed, to be manufactured.

In the method of manufacturing the multilayer varistor (1) of a thirteenth aspect referring to the twelfth aspect, the solution contains polysilazane.

According to the thirteenth aspect, using polysilazane, which is a glass component having Si in its main chain, as the precursor of the high-resistance layer (13) enables a continuous high-resistance layer (13) including $SiO_2$ as a major component to be formed. Such a high-resistance layer (13) could be considered to further reduce the exposed portions of the sintered body (11), so that the multilayer varistor (1), in which the occurrence of the migration is further suppressed, is manufacturable.

In a method of manufacturing the multilayer varistor (1) of a fourteenth aspect referring to any one of the tenth to thirteenth aspects, the first step includes a coating step, an internal electrode application step, a lamination step, a cutting step, and a baking step. The coating step includes producing ceramic sheets including ZnO as a major component. The internal electrode application step includes applying an internal electrode paste to some of the ceramic sheets. The lamination step includes stacking, on each other, the ceramic sheets provided with the internal electrode paste and the ceramic sheets not provided with the internal electrode paste to obtain a laminate. The cutting step includes cutting the laminate to obtain a laminate body having a lamination surface and a cut surface. The baking step includes baking the laminate body to obtain the sintered body (11) having a lamination surface and a cut surface. An arithmetic mean roughness of the cut surface of the sintered body (11) is greater than an arithmetic mean roughness of the lamination surface of the sintered body (11).

According to the fourteenth aspect, the sintered body (11) having the pair of main surfaces opposite to each other, the pair of side surfaces opposite to each other, and the pair of end surfaces opposite to each other is produced. In this sintered body (11), the Ra of the cut surface is greater than the Ra of the lamination surface. Thus, forming the high-resistance layer (13) on the sintered body (11) to produce the multilayer varistor (1) enables the Ra of the surface of the side surface high-resistance layer (13*b*) to be greater than the Ra of the surface of the main surface high-resistance layer (13*a*). This consequently enables the occurrence of the migration caused by the movement of ions and the like at the side surfaces to be further suppressed.

A method of manufacturing the multilayer varistor (1) of a fifteenth aspect includes a first step, a second step, a third step, and a fourth step. The first step includes preparing a sintered body (11) including ZnO as a major component, an internal electrode (12) being disposed in the sintered body (11). The second step includes forming a high-resistance layer (13) covering at least part of the sintered body (11). The third step includes applying a primary electrode paste such that the primary electrode paste covers part of the high-resistance layer (13) and is in contact with part of the internal electrode (12). The fourth step includes forming a plating electrode (16) covering at least part of a primary electrode (15) formed from the primary electrode paste. The second step includes spraying a solution including a precursor of the high-resistance layer (13) onto a plurality of the sintered bodies (11) while stirring the sintered bodies (11), and thermally treating each of the sintered bodies (11) provided with the precursor to form the high-resistance layer (13).

According to the fifteenth aspect, the high-resistance layer (13) having a large number of raised portions is formable, and therefore, the fifteenth aspect enables the Ra of the high-resistance layer (13) to be increased, which consequently enables the multilayer varistor (1), in which the occurrence of the migration is suppressed, to be manufactured.

In a method of manufacturing the multilayer varistor (1) of the sixteenth aspect referring to the fifteenth aspect, the solution contains polysilazane.

According to the sixteenth aspect, using polysilazane, which is a glass component having Si in its main chain, as the precursor of the high-resistance layer (13) enables a continuous high-resistance layer (13) including $SiO_2$ as a major component to be formed. Such a high-resistance layer (13) could be considered to further reduce the exposed portions of the sintered body (11), so that the multilayer varistor (1), in which the occurrence of the migration is further suppressed, is manufacturable.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:
a sintered body;
an internal electrode in the sintered body;
a high-resistance layer covering at least part of the sintered body; and
an external electrode covering part of the high-resistance layer, the external electrode being electrically connected to the internal electrode, wherein:
an arithmetic mean roughness of a surface of the high-resistance layer is greater than or equal to 0.06 μm, and
a mean thickness of the high-resistance layer is greater than or equal to 0.01 μm and less than or equal to 5 μm.

2. The multilayer varistor of claim 1, wherein
the high-resistance layer has a plurality of raised portions each having a thickness of greater than 1 μm, and
an average length of major axes of the plurality of raised portions is greater than or equal to 10 μm and less than or equal to 50 μm.

3. The multilayer varistor of claim 2, wherein
a total area of the plurality of raised portions is greater than or equal to 5% and less than or equal to 30% of a whole area of the surface of the high-resistance layer.

4. The multilayer varistor of claim 1, wherein
the external electrode includes
a primary electrode covering part of the high-resistance layer and
a plating electrode covering at least part of the primary electrode, and
the primary electrode includes silver as a major component.

5. The multilayer varistor of claim 1, wherein
the sintered body has
a pair of main surfaces opposite to each other,
a pair of side surfaces opposite to each other, and
a pair of end surfaces opposite to each other,
the internal electrode faces the main surfaces,
the external electrode covers one of the end surfaces, and
the arithmetic mean roughness of the surface of the high-resistance layer is greater on the side surfaces than on the main surfaces.

6. The multilayer varistor of claim 1, wherein the high-resistance layer includes $SiO_2$ as a major component.

7. A multilayer varistor comprising:

a sintered body;

an internal electrode in the sintered body;

a high-resistance layer covering at least part of the sintered body; and an external electrode covering part of the high-resistance layer, the external electrode being electrically connected to the internal electrode, wherein:

an arithmetic mean roughness of a surface of the high-resistance layer is greater than or equal to 0.06 μm, and is less than or equal to 0.9 μm.

8. The multilayer varistor of claim 7, wherein a mean thickness of the high-resistance layer is greater than or equal to 0.01 μm and less than or equal to 5 μm.

9. A multilayer varistor comprising:

a sintered body having a pair of main surfaces opposite to each other, a pair of side surfaces opposite to each other, and a pair of end surfaces opposite to each other;

an internal electrode disposed in the sintered body, the internal electrode facing the main surfaces;

a high-resistance layer covering at least part of the sintered body; and an external electrode covering part of the high-resistance layer on one of the end surfaces, the external electrode being electrically connected to the internal electrode, an arithmetic mean roughness of a surface of the high-resistance layer being greater on the side surfaces than on the main surfaces.

10. A method of manufacturing a multilayer varistor, the method comprising:

a first step of preparing a sintered body including ZnO as a major component, an internal electrode being provided in the sintered body;

a second step of forming a high-resistance layer covering at least part of the sintered body;

a third step of applying a primary electrode paste such that the primary electrode paste covers part of the high-resistance layer and is in contact with part of the internal electrode; and a fourth step of forming a plating electrode covering at least part of a primary electrode formed from the primary electrode paste, an arithmetic mean roughness of a surface of the high-resistance layer after the second step being greater than or equal to 0.06 μm and less than or equal to 0.9 μm.

11. The method of claim 10, wherein the arithmetic mean roughness of the surface of the high-resistance layer after the second step is greater than an arithmetic mean roughness of a surface of the sintered body after the first step.

12. The method of claim 10, wherein the second step includes spraying, while stirring a plurality of the sintered bodies, a solution including a precursor of the high-resistance layer onto the sintered bodies, and thermally treating each of the sintered bodies provided with the precursor to form the high-resistance layer.

13. The method of claim 12, wherein the solution contains polysilazane.

14. The method of claim 10, wherein the first step includes producing ceramic sheets including ZnO as a major component, applying an internal electrode paste to some of the ceramic sheets, stacking, on each other, the ceramic sheets provided with the internal electrode paste and the ceramic sheets not provided with internal electrode paste to obtain a laminate, cutting the laminate to obtain a laminate body having a lamination surface and a cut surface, baking the laminate body to obtain the sintered body having a lamination surface and a cut surface, an arithmetic mean roughness of the cut surface of the sintered body is greater than an arithmetic mean roughness of the lamination surface of the sintered body.

15. A method of manufacturing a multilayer varistor, the method comprising:

a first step of preparing a sintered body including ZnO as a major component, an internal electrode being provided in the sintered body;

a second step of forming a high-resistance layer covering at least part of the sintered body;

a third step of applying a primary electrode paste such that the primary electrode paste covers part of the high-resistance layer and is in contact with part of the internal electrode; and a fourth step of forming a plating electrode covering at least part of a primary electrode formed from the primary electrode paste, the second step including spraying, while mixing and stirring a plurality of the sintered bodies, a solution including a precursor of the high-resistance layer toward the sintered bodies, and thermally treating each of the sintered bodies provided with the precursor to form the high-resistance layer.

16. The method of claim 15, wherein the solution contains polysilazane.

* * * * *